United States Patent [19]

Unze

[11] Patent Number: 5,669,471

[45] Date of Patent: Sep. 23, 1997

[54] TRAILER WIRE RECOIL DEVICE

[76] Inventor: Brian H. Unze, 1245 Miller St., Shakopee, Minn. 55379

[21] Appl. No.: 698,354

[22] Filed: Aug. 15, 1996

[51] Int. Cl.⁶ ........................................ H02G 11/02
[52] U.S. Cl. ........................... 191/12.2 R; 439/501
[58] Field of Search ................... 191/12.2 R, 12.4; 280/420, 422; 439/35, 501, 503

[56] References Cited

U.S. PATENT DOCUMENTS

| | | | |
|---|---|---|---|
| 2,391,141 | 12/1945 | Dour et al. | 191/12.2 R |
| 4,713,497 | 12/1987 | Smith | 191/12.2 R |
| 4,846,697 | 7/1989 | Rodgers | 439/35 |
| 4,940,427 | 7/1990 | Pearson | 439/501 |
| 5,056,698 | 10/1991 | Kozakevich | 191/12.2 R X |
| 5,129,828 | 7/1992 | Bass | 191/12.2 R X |
| 5,380,209 | 1/1995 | Converse, Jr. et al. | 280/422 X |

*Primary Examiner*—Karen B. Merritt
*Assistant Examiner*—Scott L. Lowe

[57] ABSTRACT

A trailer wire recoil device including a housing that has a plurality of mounting holes within a front wall. Each mounting hole receives a screw that extends through a rear wall for mounting the housing behind a vehicle's license plate. A receptacle has an internal wire positioned within a connector block of the housing. The receptacle is positioned within a slot of a left side edge of the housing. Also, a rotatable member is provided. An axle rod is vertically positioned within the housing between the front wall and the rear wall. The axle rod has a disc member with a plurality of contact points that are in connection with the connector block. The rotatable member is positioned over the axle rod and in contact with the disc. A trailer wire is wrapped around the rotatable member positioned within the housing and extends from a right side edge of the housing. A spring member is attached to the axle rod and the rotatable member. Lastly, when in use the trailer wire recoil device can be rapidly deployed off the rotatable member within the housing for coupling with a trailer receptacle.

1 Claim, 3 Drawing Sheets

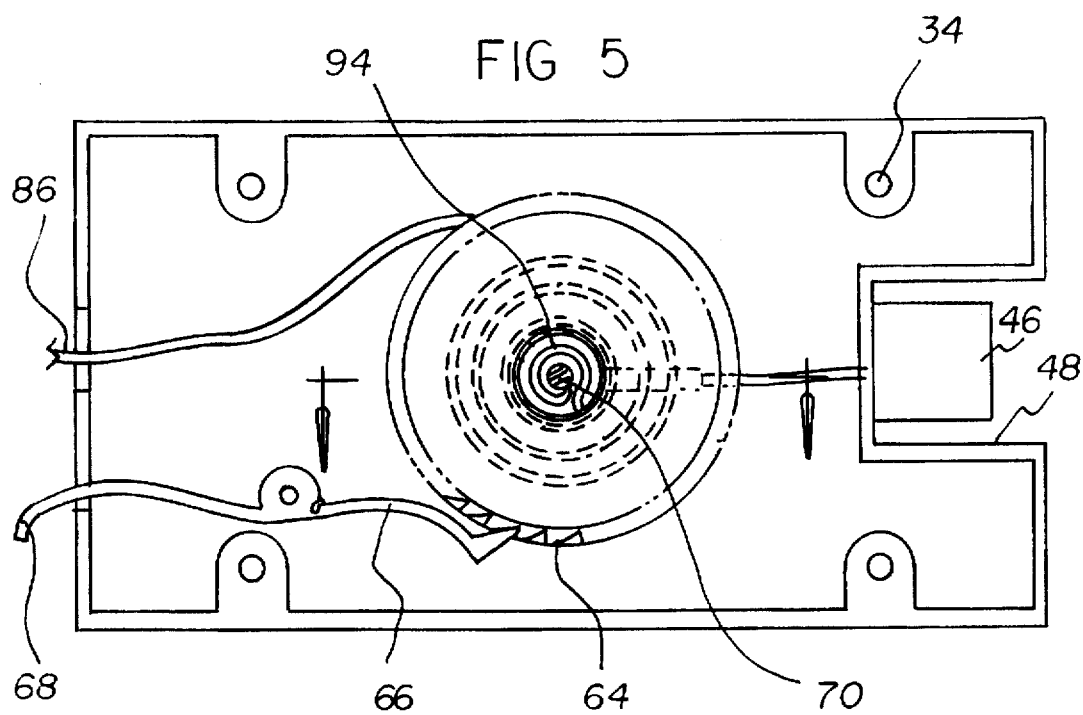
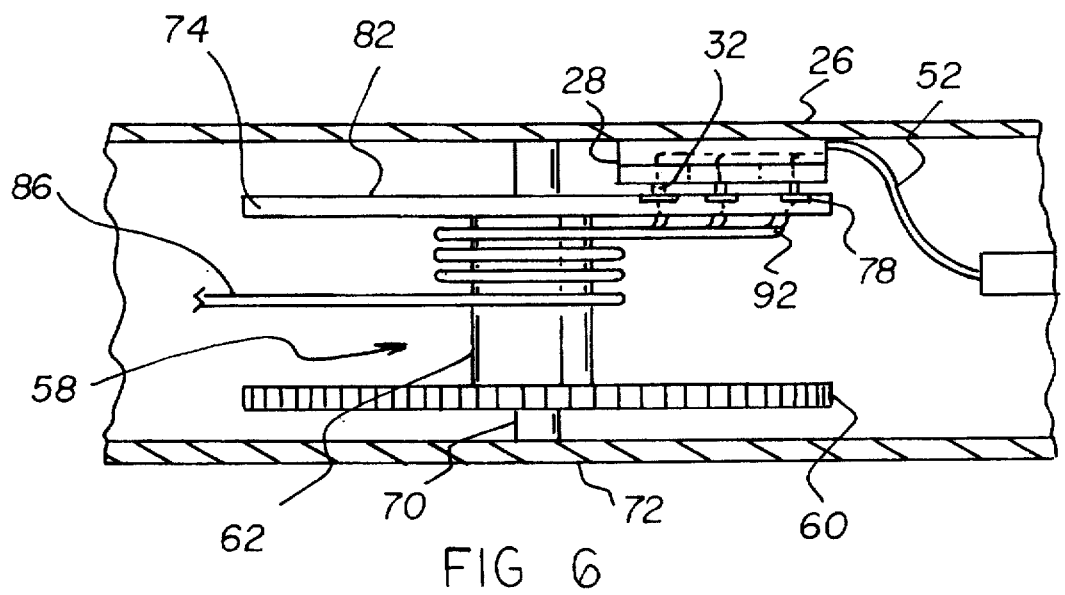

TRAILER WIRE RECOIL DEVICE

BACKGROUND OF THE INVENTION

1. Field of the Invention

The present invention relates to a tailer wire recoil device and more particularly pertains to allowing the rewinding and storing of the electrical wire, used in vehicle and trailer electrical hook-ups, behind the vehicle license plate.

2. Description of the Prior Art

The use of an electrical wire reel is known in the prior art. More specifically, electrical wire reels heretofore devised and utilized for the purpose of storage are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,940,427 to Pearson discloses an electrical trailer connector retainer. U.S. Pat. No. 4,520,239 to Schwartz discloses an electrical cord reel and storage system. U.S. Pat. No. Des. 296,661 to Kovacik et al. discloses a housing for an extension wire reel. U.S. Pat. No. 4,842,524 to Hopkins and Tan discloses a trailer light connection system. Lastly, U.S. Pat. No. 4,106,834 to Horowitz discloses an electrical connector.

While these devices fulfill their respective, particular objectives and requirements, the aforementioned patents do not describe a trailer wire recoil device that allows the user to mount the device to the vehicle behind the license plate and connect the device to the vehicle's trailer plug at one end and the trailer's wire hook up at another end, while providing enclosed storage of the wire when not in use.

In this respect, the trailer wire recoil device according to the present invention substantially departs from the conventional concepts and designs of the prior art, and in doing so provides an apparatus primarily developed for the purpose of allowing the rewinding and storing of the electrical wire, used in vehicle and trailer hook-up, behind the vehicle license plate.

Therefore, it can be appreciated that there exists a continuing need for a new and improved trailer wire recoil device which can be used for providing for the rewinding and storing of the electrical wire, used in vehicle and trailer hook-up, behind the vehicle license plate. In this regard, the present invention substantially fulfills this need.

SUMMARY OF THE INVENTION

In view of the foregoing disadvantages inherent in the known types of electrical wire reels now present in the prior art, the present invention provides an improved trailer wire recoil device. As such, the general purpose of the present invention, which will be described subsequently in greater detail, is to provide a new and improved trailer wire recoil device and method which has all the advantages of the prior art and none of the disadvantages.

To attain this, the present invention essentially comprises a rectangular housing. The housing has a front wall, a rear wall and peripheral edges therearound. The peripheral edges have a right side edge and a left side edge. The peripheral edges have an upper edge with a connector block internal the housing. The connector block has a plurality of bushings. The housing has a plurality of mounting holes within the front wall that are axially extended horizontally through the rear wall. Each of the mounting holes receives a screw for mounting the housing behind a vehicle's license plate. Also, a receptacle is positioned within a slot of the left side edge of the housing. The receptacle has an internal wire positioned within the connector block of the housing. The receptacle couples with a vehicle plug when the housing is mounted onto the vehicle. A rotatable member has a flange fixedly attached to a cylinder. The flange has teeth around a peripheral edge thereof for engaging a pawl. Included is an axle rod that is fixedly attached within the housing to the upper edge and a lower edge of the peripheral edges. The axle rod has a disc member that is adjacent the upper edge of the housing. The disc has a plurality of contact points on a top surface thereof and in connection with the bushings of the connector block. The rotatable member is positioned over the axle and in contact with the disc. The flange of the rotatable member is spaced from the disc of the axle and the lower edge of the housing. Additionally, an elongated trailer wire has a first end with a plug extending from the right side of the housing to couple with a trailer receptacle. The trailer wire has a second end coupled with the contact points of the disc of the axle rod, when the trailer wire being wrapped around the rotatable member positioned within the housing. A spring member is attached to the axle rod and the rotatable member. Unwinding the trailer wire from the rotatable member causes the rotatable member to wind the spring member. Whereby, when in use, the trailer wire recoil device can be rapidly deployed off the rotatable member within the housing for coupling with the trailer receptacle. Pulling the plug out and away from the housing to extend the trailer wire for coupling. When not in use, the plug can be uncoupled to allow the trailer wire to be rewound onto the rotatable member within the housing by a restoring torsional force created by the spring member.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trailer wire recoil device which has all of the advantages of the prior art electrical wire reels and none of the disadvantages.

It is another object of the present invention to provide a new and improved trailer wire recoil device which may be easily and efficiently manufactured and marketed.

It is further object of the present invention to provide a new and improved trailer wire recoil device which is of durable and reliable constructions.

An even further object of the present invention is to provide a new and improved trailer wire recoil device which is susceptible of a low cost of manufacture with regard to both materials and labor, and which accordingly is then susceptible of low prices of sale to the consuming public, thereby making such trailer wire recoil device economically available to the buying public.

Still yet another object of the present invention is to provide a new and improved trailer wire recoil device which provides in the apparatuses and methods of the prior art some of the advantages thereof, while simultaneously overcoming some of the disadvantages normally associated therewith.

Even still another object of the present invention is to provide a trailer wire recoil device for allowing the rewinding and storing of the electrical wire, used in vehicle and trailer hook-up, behind the vehicle license plate.

Lastly, it is an object of the present invention to provide a new and improved trailer wire recoil device including a housing that has a plurality of mounting holes within a front wall. Each mounting hole receives a screw that extends through a rear wall for mounting the housing behind a vehicle's license plate. A receptacle has an internal wire positioned within a connector block of the housing. The receptacle is positioned within a slot of a left side edge of the housing. Also, a rotatable member is provided. An axle rod is vertically positioned within the housing between the front wall and the rear wall. The axle rod has a disc member with a plurality of contact points that are in connection with the connector block. The rotatable member is positioned over the axle rod and in contact with the disc. A trailer wire is wrapped around the rotatable member positioned within the housing and extends from a right side edge of the housing. A spring member is attached to the axle rod and the rotatable member. Lastly, when in use the trailer wire recoil device can be rapidly deployed off the rotatable member within the housing for coupling with a trailer receptacle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is cross-sectional view of the present invention taken along line 5—5 if FIG. 4.

FIG. 6 is a cross sectional view of the present invention in an operable configuration taken along line 6—6 of FIG. 5.

The same reference numerals refer to the same parts through the various Figures.

DESCRIPTION OF THE PREFERRED EMBODIMENT

Figure 1:
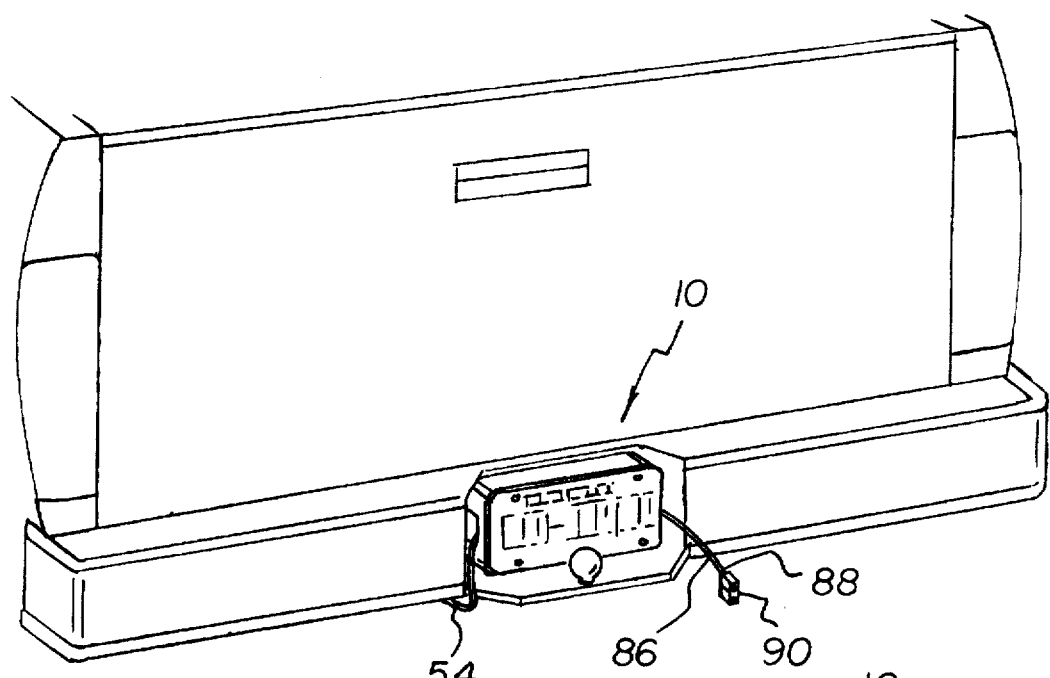
FIG. 1 is a perspective view of the preferred embodiment of the trailer wire recoil device constructed in accordance with the principles of the present invention.

With reference now to the drawings, and in particular to FIG. 1 thereof, the preferred embodiment of the new and improved trailer wire recoil device embodying the principles and concepts of the present invention and generally designated by the reference numeral 10 will be described.

The present invention, the Trailer wire recoil device 10 is comprised of a plurality of components. Such components in their broadest context include a housing, a rotatable member, an axle rod and wire. Such components are individually configured and correlated with respect to each other so as to attain the desired objective.

Figure 2:
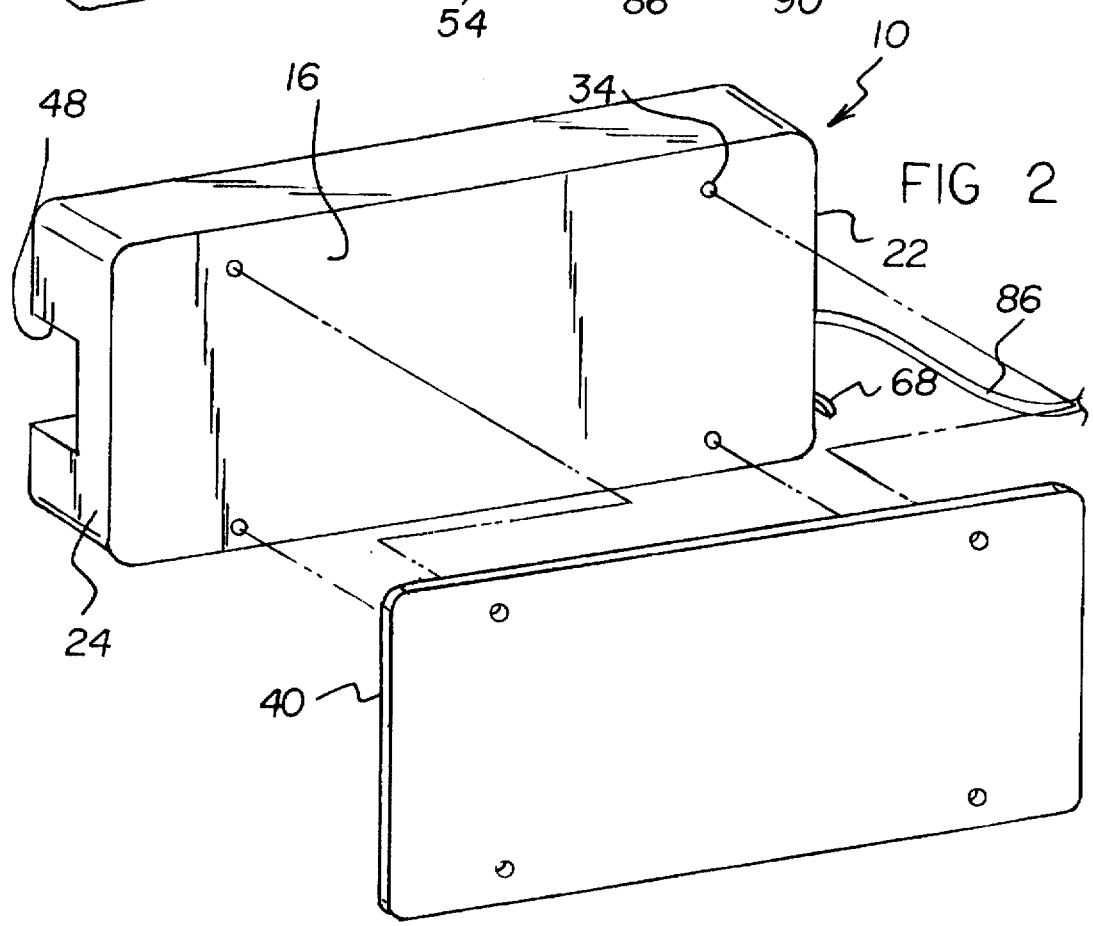
FIG. 2 is an exploded view of the present invention of FIG. 1.
Figure 3:
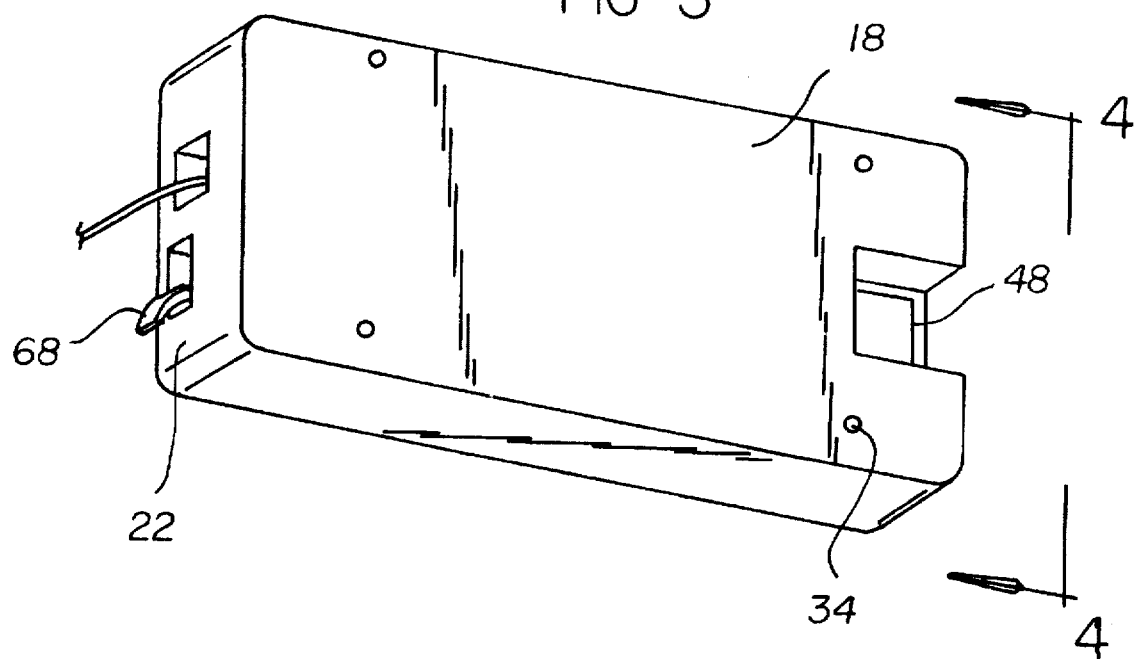
FIG. 3 is rear elevational view of the present invention.
Figure 4:
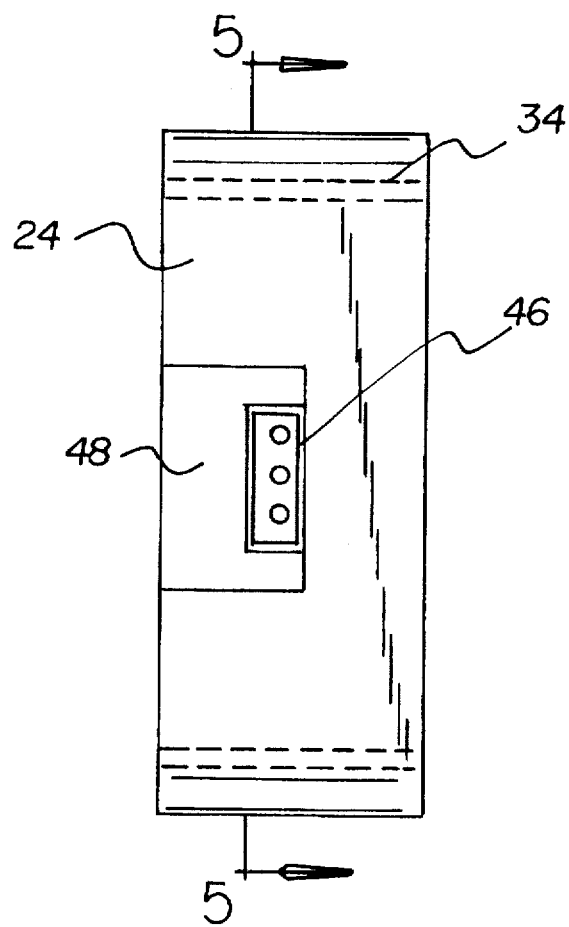
FIG. 4 is side elevational view of the present invention taken along line 4—4 of FIG. 3.

Specifically, the present invention includes a rectangular housing 14. The housing has a front wall 16, a rear wall 18 and peripheral edges therearound, as shown in FIG. 2. The peripheral edges have a right side edge 22 and a left side edge 24. The peripheral edges have an upper edge 26, connector block 28 internally to the rear wall of the housing, as seen in FIG. 6. The connector block having a plurality of bushings 32.

The housing has a plurality of mounting holes 34 within the front wall. As shown in FIG. 5, the holes are axially extended horizontally. The holes extend from the front wall through the rear wall. Each of the mounting holes is capable of receiving a screw for mounting the housing behind a vehicle's 38 license plate 40, in the manner depicted in FIG. 1. The vehicle, as shown, is a truck but it is to be understood that the vehicle may be a car or any towing vehicle.

Also, a receptacle 46 is positioned within a slot 48 of the left side edge of the housing 14. The receptacle has an internal wire 52 positioned within the connector block 28 of the housing. The internal wire is fastened with the plurality of bushings 32 of the connector block. The receptacle can couple with a vehicle plug when the housing is mounted onto the vehicle. In FIG. 1, the wire 54 of the vehicle plug is shown entering into the slot of the left side 24 of the housing.

Included is a rotatable member 58 that has a flange 60 fixedly attached to a cylinder 62. The flange has teeth 64 around a peripheral edge thereof for engaging a pawl 66. The pawl is positioned within the housing and has a release arm 68. The release arm extends through the right side edge of the peripheral edges. The rotatable member functions as a ratchet mechanism when turned.

Additionally, an axle rod 70 is fixedly attached, within the housing, to the front wall 16 and rear wall 18 and between the upper edge and a lower edge 72 of the peripheral edges. The axle rod has a disc member 74 that is adjacent the rear wall of the housing. The disc member provides non-rotatable mounting for a plurality of contact points 78 on a top surface 82. The plurality of contact points are in connection with the bushings 32 of the connector block to form an electrical connection for the transfer of current. The rotatable member is positioned over the axle and in contact with the disc. The flange of the rotatable member is spaced from the disc of the axle and the front wall of the housing. The rotatable member may be spun around the axle rod without causing the rotation of the disc member.

As illustrated in FIG. 6, an elongated trailer wire 86 is provided. The trailer wire has a first end 88 with a trailer plug 90 extending from the right side 22 of the housing. The trailer plug is used to couple with a trailer receptacle of a trailer that will be towed by the vehicle. The trailer wire has a second end 92 that is coupled with the contact points 78 of the disc of the axle rod. The second end makes contact when the trailer wire is wrapped around the rotatable member positioned within the housing.

A spring member 94 is attached to the axle rod 70 and the cylinder of the rotatable member 58. Unwinding the trailer wire from the rotatable member causes the rotatable member to wind the spring member. When the trailer wire is unwound, the pawl engages the teeth of the flange to lock the flange in position. Locking the flange in position prevents the uncontrolled rewinding of the trailer wire onto the rotatable member.

Whereby, when in use, the trailer wire recoil device 10 can be rapidly deployed off the rotatable member 58 within the housing for coupling with the trailer receptacle. Pulling the trailer plug 90 out and away from the housing extends the trailer wire for coupling, while the pawl locks the flange. When not in use, the trailer plug can be uncoupled, while the release arm 68 is held, to allow the trailer wire to be rewound onto the rotatable member within the housing by a restoring torsional force created by the spring member.

The present invention is a trailer accessory structured to store the trailer's electrical hook-up wires conveniently as hand. The housing is a rigid plastic that is sized to be mounted behind the towing vehicle's license plate. Inside the housing is a spring-loaded recoil spool that will retract and store the electrical wire for the trailer hook-up. The towing vehicle's trailer wires plug into the unit at the left side, and the wire reels out of the unit at the right side for connection to the trailer's electrical system. The present invention is provided with a ratchet wheel as part of the spool. Also a pawl is included to prevent the spool from winding until the release arm is depressed by the user. Mounting hardware is brass and all internal components are designed for years of corrosion-free service. Enough wire is held around the cylinder of the rotatable member to allow hook-ups between various vehicle/trailer configurations.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved trailer wire recoil device for storage of a trailer's electrical hook-up wires comprising in combination:

a rectangular housing being sized for mounting behind a vehicle's license plate, the housing having a front wall, a rear wall and peripheral edges therearound, the peripheral edges having a right side edge and a left side edge, the peripheral edges having an upper edge and a lower edge, a connector block being attached to the rear wall and internal the housing, the connector block having a plurality of bushings, the housing having a plurality of mounting holes within the front wall being axially extended horizontally through the rear wall, each of the mounting holes being capable of receiving a screw for mounting the housing behind the vehicle's license plate;

a receptacle being positioned within a slot of the left side edge of the housing, the receptacle having an internal wire positioned within the connector block of the housing, the internal wire being fastened with the plurality of bushings of the connector block of the housing, the receptacle coupling with a vehicle plug when the housing is mounted onto the vehicle;

a rotatable member having a flange fixedly attached to a cylinder, the flange having teeth around a peripheral edge thereof for engaging a pawl, the pawl having a release arm and being positioned within the housing, the release arm of the pawl being extended through the right side edge of the peripheral edges of the housing, the rotatable member functioning as a ratchet mechanism when turned;

an axle rod being fixedly attached within the housing to the rear wall and front wall and between the upper edge and a lower edge of the peripheral edges, the axle rod having a disc member being adjacent the rear wall of the housing, the disc member providing fixed mounting for a plurality of contact points on a top surface thereof, the plurality of contact points on the top surface thereof being in connection with the bushings of the connector block, the rotatable member being positionable over the axle rod and in contact with the disc member thereof, the flange of the rotatable member being spaced from the disc member of the axle rod and the front wall of the housing, the rotatable member being cable of spinning about the axle rod with the disc member remaining stationary;

an elongated trailer wire having a first end with a trailer plug extending from the right side of the housing for coupling with a trailer receptacle, the trailer wire having a second end being coupled with the contact points of the disc member of the axle rod when the trailer wire is wrapped around the rotatable member positioned within the housing;

a spring member being attached to the axle rod and the rotatable member so that unwinding the trailer wire from the rotatable member causes the rotatable member to wind the spring member, the spring member being released at a control rate by the pawl engaging the teeth of the flange when the rotatable member being rotated by pulling the trailer wire; and whereby when in use the trailer wire can be rapidly deployed off the rotatable member within the housing for coupling with the trailer receptacle by pulling the trailer plug out and away from the housing to extend the trailer wire for coupling and when not in use, the trailer plug can be uncoupled to allow the trailer wire to be rewound onto the rotatable member within the housing by a restoring torsional force created by the spring member.

* * * * *